United States Patent
Toyoda et al.

(10) Patent No.: US 11,697,453 B2
(45) Date of Patent: Jul. 11, 2023

(54) STEERING SYSTEM

(71) Applicant: TOYOTA JIDOSHA KABUSHIKI KAISHA, Toyota (JP)

(72) Inventors: Hiroyuki Toyoda, Mie-ken (JP); Hiroki Murata, Toyota (JP)

(73) Assignee: TOYOTA JIDOSHA KABUSHIKI KAISHA, Tokyo (JP)

( * ) Notice: Subject to any disclaimer, the term of this patent is extended or adjusted under 35 U.S.C. 154(b) by 84 days.

(21) Appl. No.: 17/389,566

(22) Filed: Jul. 30, 2021

(65) Prior Publication Data

US 2022/0041206 A1 Feb. 10, 2022

(30) Foreign Application Priority Data

Aug. 6, 2020 (JP) .................. 2020-134022

(51) Int. Cl.
*B62D 5/04* (2006.01)

(52) U.S. Cl.
CPC ......... *B62D 5/0457* (2013.01); *B62D 5/0418* (2013.01)

(58) Field of Classification Search
CPC ............................ B62D 5/0457; B62D 5/0418
See application file for complete search history.

(56) References Cited

U.S. PATENT DOCUMENTS

| | | | |
|---|---|---|---|
| 6,554,094 B1* | 4/2003 | Bell | B62D 5/0418 152/416 |
| 6,568,697 B1* | 5/2003 | Brill | B62D 7/09 280/124.134 |
| 2009/0057050 A1* | 3/2009 | Shiino | B62D 7/18 180/444 |
| 2018/0354547 A1* | 12/2018 | Pattok | B62D 7/14 |
| 2019/0225269 A1* | 7/2019 | Yamazaki | B62D 7/148 |
| 2019/0283804 A1* | 9/2019 | Ojima | B62D 5/0457 |
| 2020/0207405 A1* | 7/2020 | Kuribayashi | B60K 11/06 |
| 2020/0239063 A1* | 7/2020 | Brooks | B62D 5/006 |
| 2020/0391796 A1* | 12/2020 | Kojima | B62D 15/021 |

FOREIGN PATENT DOCUMENTS

| | | | | |
|---|---|---|---|---|
| JP | 2011-131777 A | 7/2011 | | |
| JP | 2019-182272 A | 10/2019 | | |
| WO | WO-2014101756 A1 * | 7/2014 | | B62D 5/0418 |
| WO | WO-2018235343 A1 * | 12/2018 | | B62D 5/0403 |

* cited by examiner

*Primary Examiner* — Minnah L Seoh
*Assistant Examiner* — Ryan Edward Hardy
(74) *Attorney, Agent, or Firm* — Sughrue Mion, PLLC

(57) ABSTRACT

A steering system including a plurality of steering devices respectively provided for a plurality of steerable wheels that belong to at least one of a front-wheel side and a rear-wheel side of a vehicle, wherein the plurality of steering devices respectively include a plurality of steering actuators, and wherein each of at least one of the plurality of steering actuators is disposed on an inner side of a corresponding one of side members of the vehicle.

6 Claims, 6 Drawing Sheets

STEERING SYSTEM

CROSS REFERENCE TO RELATED APPLICATION

The present application claims priority to Japanese Patent Application No. 2020-134022, which was filed on Aug. 6, 2020, the disclosure of which is herein incorporated by reference in its entirety.

BACKGROUND

Technical Field

The following disclosure relates to a steering system including a plurality of steering devices which are respectively provided for a plurality of steerable wheels of a vehicle and each of which independently steers a corresponding one of the steerable wheels.

Description of Related Art

Patent Document 1 (Japanese Patent Application Publication No. 2019-182272) discloses a steering system including a plurality of steering devices provided respectively for left and right steerable wheels of a vehicle and configured to independently steer the corresponding steerable wheels. In the disclosed steering system, a steering actuator of each of the plurality of steering devices is attached to a corresponding shock absorber to cause a main body of the shock absorber to rotate about an axis thereof, so as to steer the corresponding steerable wheel.

SUMMARY

An aspect of the present disclosure is to improve mountability of a steering actuator of a steering device.

In the present steering system, a plurality of steering devices respectively include a plurality of steering actuators, and each of at least one of the plurality of steering actuators is disposed on an inner side of a corresponding side member. The steering actuator extends in its longitudinal direction. In installing the steering actuator, a long space extending in the longitudinal direction is required. In a vehicle on which a drive source not including an engine is installed, it is easy to leave such a longitudinal space on the inner side of the side member, as compared with an outer side of the side member. Thus, provision of the steering actuator on the inner side of the side member enhances mountability of the steering actuator.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION OF EMBODIMENT

Figure 1:
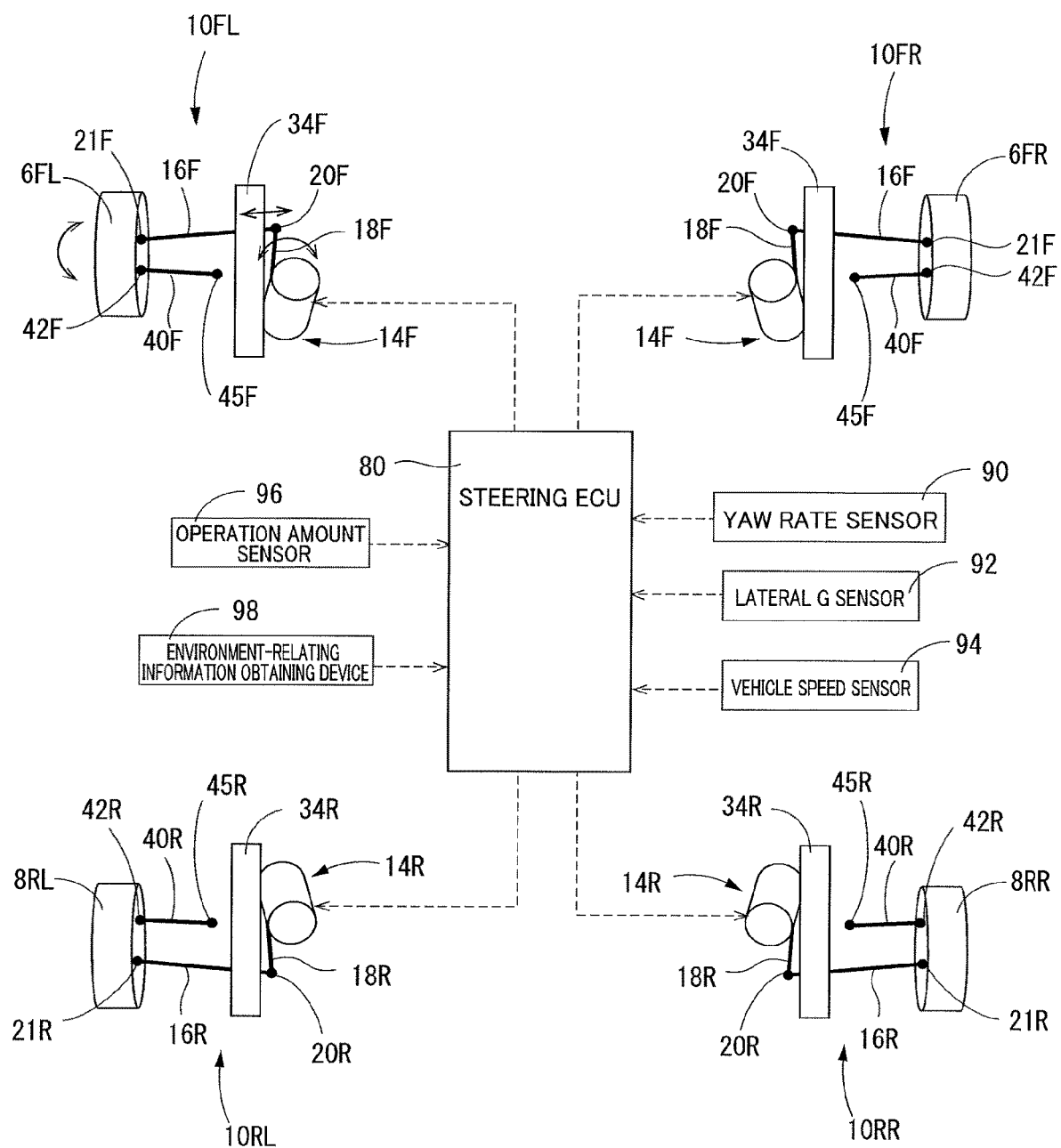
FIG. 1 is a view conceptually illustrating a steering system according to one embodiment of the present disclosure.

Referring to the drawings, there will be hereinafter explained in detail a steering system according to one embodiment of the present disclosure.

As illustrated in FIG. 1, the present steering system includes a plurality of steering devices provided respectively for a plurality of steerable wheels of a vehicle. The vehicle of the present embodiment is a 4-wheel steering vehicle having front left and right wheels 6FL, 6FR (i.e., a front left wheel 6FL and a front right wheel 6FR) and rear left and right wheels 8RL, 8RR (i.e., a rear left wheel 8RL and a rear right wheel 8RR). The front left and right wheels 6FL, 6FR and the rear left and right wheels 8RL, 8RR are steerable wheels. Front-wheel-side steering devices 10FL, 10FR are provided respectively for the front left and right wheels 6FL, 6FR. Rear-wheel-side steering devices 10RL, 10RR are provided respectively for the rear left and right wheels 8RL, 8RR.

The front-wheel-side steering devices 10FL, 10FR will be each or collectively referred to as "front-wheel-side steering device 10F" where appropriate. The rear-wheel-side steering devices 10RL, 10RR will be each or collectively referred to as "rear-wheel-side steering device 10R" where appropriate. Similarly, the front left and right wheels 6FL, 6FR will be each or collectively referred to as "front wheel 6F", and the rear left and right wheels 8RL, 8RR will be each or collectively referred to as "rear wheel 8R" where appropriate.

Figure 2:
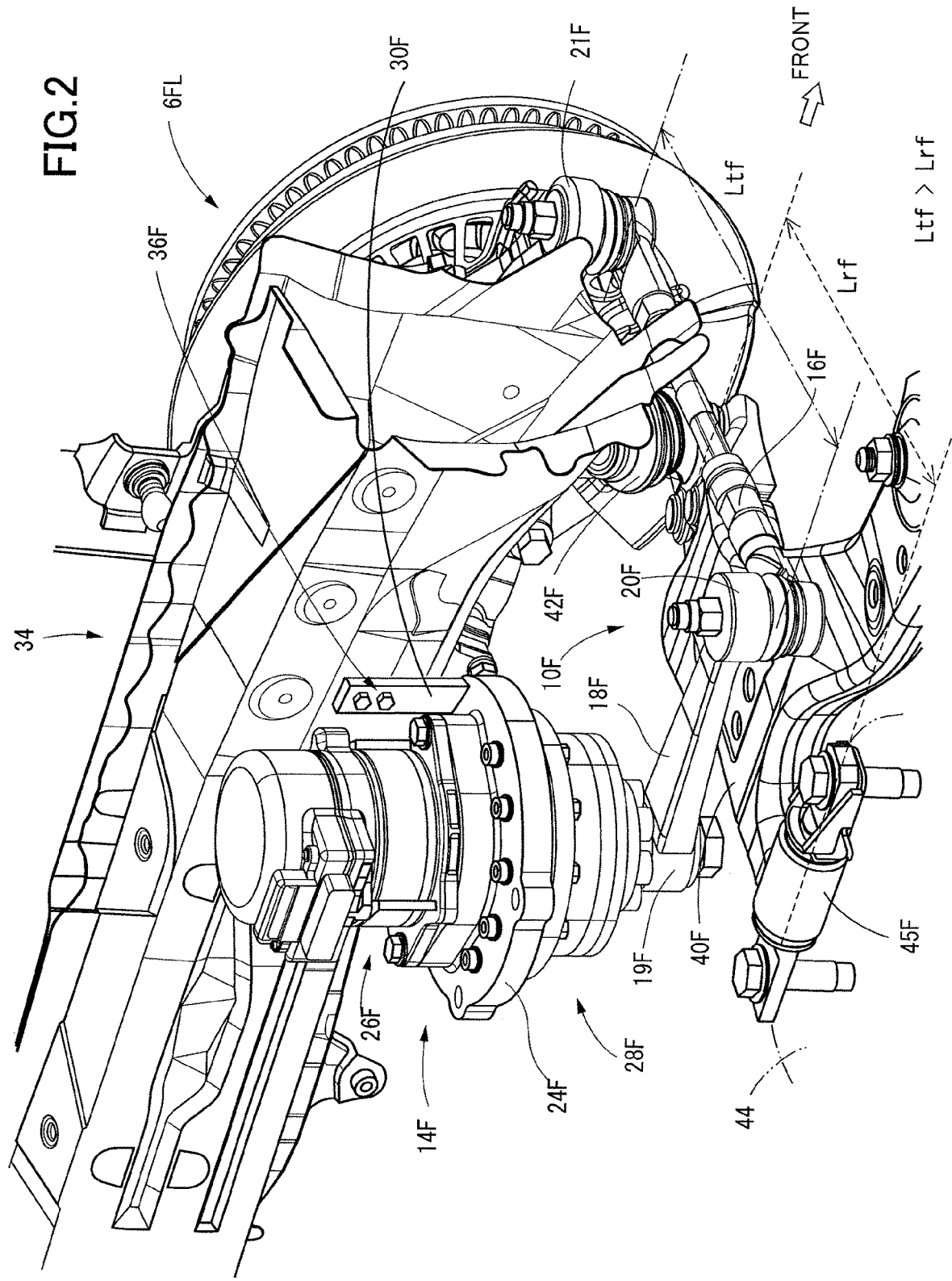
FIG. 2 is a view illustrating a steering device as a constituent element of the steering system and components around the steering device.

FIG. 2 is a view of the front-wheel-side steering device 10F provided for the front left wheel 6FL, which is one of the four steering devices 10F, 10R. The front-wheel-side steering device 10F includes a steering actuator 14F, a tie rod 16F, a pitman arm 18F, etc. The pitman arm 18F is connected to an output shaft 19F of the steering actuator 14F so as to be rotatable integrally with the output shaft 19F. The tie rod 16F is connected at one end thereof to the pitman arm 18F via a connecting portion 20F that is a ball joint and at the other end thereof to a knuckle arm of a knuckle (not illustrated) via a connecting portion 21F that is a ball joint. The knuckle rotatably holds the front left wheel 6FL. The tie rod 16F is connected to the steering actuator 14F via the pitman arm 18F.

Figure 3:
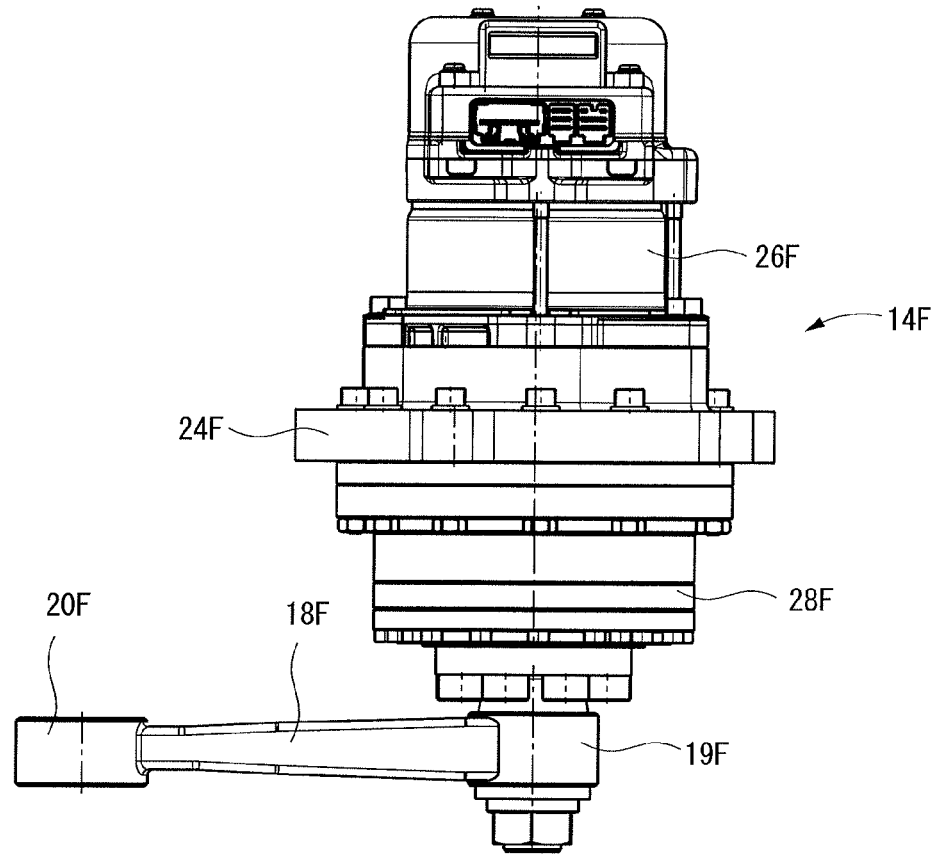
FIG. 3 is a front view of a steering actuator as a constituent element of the steering device.
Figure 4:
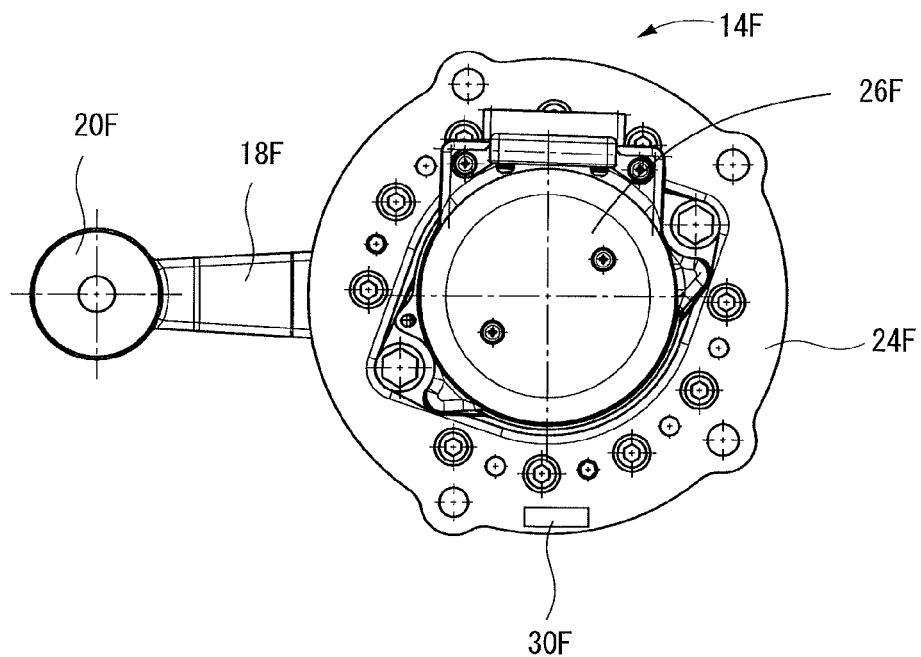
FIG. 4 is a plan view of the steering actuator.

As illustrated in FIGS. 3 and 4, the steering actuator 14F extends in its longitudinal direction and includes: a housing 24F; and a speed reducer 28F and a steering motor 26F that are held by the housing 24F so as to be arranged in series in the longitudinal direction. The steering motor 26F is an electric motor. The output shaft 19F of the steering actuator 14F functions also as an output shaft of the speed reducer 28F. As illustrated in FIG. 1, when the steering actuator 14F of the front-wheel-side steering device 10F is driven, the pitman arm 18F is rotated and the tie rod 16F is thereby moved, so that the front left wheel 6FL is steered.

A bracket 30F is provided at an intermediate portion of the housing 24F in the longitudinal direction of the steering actuator 14F so as to protrude in the longitudinal direction. The bracket 30F is attached, via a fastening device 36F as an attaching device, to an inside portion of a front side member 34F as one constituent element of a body member, namely, the bracket 30F is attached to a portion of the front side member 34F, which portion is located on one of opposite sides of the front side member 34F that is remote from the front left wheel 6FL in a width direction of the vehicle.

In the steering actuator 14F, the steering motor 26F and the speed reducer 28F are disposed in series in the longitudinal direction. Accordingly, the dimension of the steering actuator 14F in the longitudinal direction sometimes tends to be large. It is, however, difficult to leave a space for disposing a component that is long in the longitudinal direction on an outer side of the front side member 34F, in other words, it is difficult to leave such a space in an inside of or near the wheel. In this respect, the drive source installed on the present vehicle does not include an engine but includes an electric motor as a drive motor. It is thus easy to leave a space for disposing such a component long in the longitudinal direction on the inner side of the front side member 34F. Accordingly, in the present embodiment, the steering actuator 14F is disposed on the inner side of the front side member 34F, thus making it possible to easily obtain a space for disposing the steering actuator 14F and resulting in enhanced mountability.

The front left wheel 6FL is supported by a lower arm 40F as a suspension arm so as to be swingable in the up-down direction. The lower arm 40F has a generally A-shape in plan view. The lower arm 40F is connected at one end thereof to the knuckle that rotatably holds the front left wheel 6FL via a connecting portion 42F that is a ball joint and at one of the other two ends thereof to a body member 44, different from the front side member 34F, via a connecting portion 45F. The lower arm 40F is connected at the connecting portion 45F to the body member 44 so as to be swingable in the up-down direction about an axis that extends in the front-rear direction. Another one of the other two ends of the lower arm 40F is connected to a body member 44 via a connecting portion (not illustrated). At this connecting portion, the lower arm 40F is connected to the body member 44 so as to be swingable in the front-rear direction about an axis that extends in the up-down direction.

In the front-wheel-side steering device 10F, a length of the tie rod 16F, namely, a length Ltf between the connecting portion 21F with the knuckle arm and the connecting portion 20F with the pitman arm 18F, is greater than a length of the lower arm 40F, namely, a length Lrf between the connecting portion 42F with the knuckle and the connecting portion 45F with the body member 44 (Ltf>Lrf). Further, the tie rod 16F is disposed more forward, in the front-rear direction of vehicle, than a portion of the lower arm 40F that passes the connecting portion 42F and the connecting portion 45F, namely, a portion of the lower arm 40F that holds the front left wheel 6FL such that the front left wheel 6FL is swingable in the up-down direction. The connecting portion 21F and the connecting portion 20F are located more forward than the connecting portion 42F and the connecting portion 45F in the front-rear direction of the vehicle.

Figure 5:
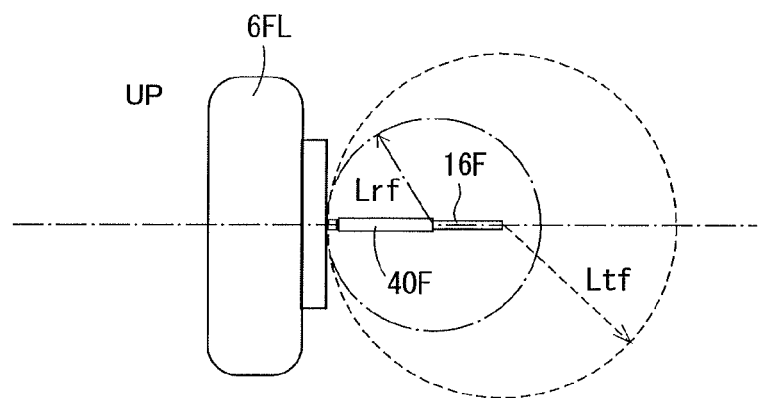
FIG. 5 is a rear view of a front wheel of the vehicle on which the steering system is installed and components around the front wheel.

In the configuration above, when the front left wheel 6FL swings relative to the body member 44 in the up-down direction, as illustrated in FIG. 5, a front portion of the front left wheel 6FL is located more outward than a rear portion thereof in the width direction of the vehicle since a radius Ltf of a locus on which the connecting portion 21F of the tie rod 16F moves is greater than a radius Lrf of a locus on which the connecting portion 42F of the lower arm 40F moves. Accordingly, the front left wheel 6FL is toed out both when it bounds and when it rebounds. Similarly, the front right wheel 6FR is toed out both when it bounds and when it rebounds.

While not illustrated in detail, the constituent elements of each of the rear-wheel-side steering devices 10R provided respectively for the rear left and right wheels 8RL, 8RR are identical with those of the front-wheel-side steering devices 10F. Thus, reference numbers of the constituent elements of the rear-wheel-side steering device 10R are suffixed with "R" in place of "F" as illustrated in FIG. 1, and detailed explanation thereof is dispensed with. In the rear-wheel-side steering device 10R, a length of the tie rod 16R, namely, a length Ltr between the connecting portion 21R with the knuckle arm and the connecting portion 20R with the pitman arm 18R, is greater than a length of the lower arm 40R, namely, a length Lrr between the connecting portion 42R with the knuckle and the connecting portion 45R with the body member 44 (Ltr>Lrr). Further, the tie rod 16R is disposed more rearward, in the front-rear direction of the vehicle, than a portion of the lower arm 40R that passes the connecting portion 42R and the connecting portion 45R, namely, a portion of the lower arm 40R that holds the rear left wheel 8RL such that the rear left wheel 8RL is swingable in the up-down direction. The connecting portion 21R and the connecting portion 20R are located more rearward than the connecting portion 42R and the connecting portion 45R in the front-rear direction of the vehicle. It is noted that the steering actuator 14R of the rear-wheel-side steering device 10R is disposed on an inner side of a rear side member 34R.

Figure 6:
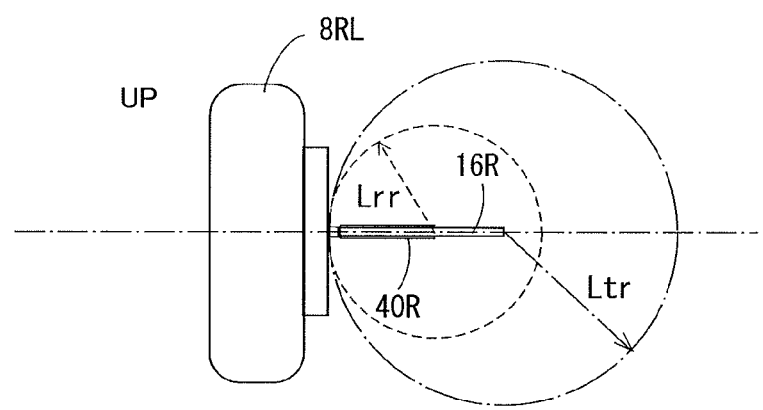
FIG. 6 is a rear view of a rear wheel of the vehicle and components around the rear wheel.

In the configuration above, when the rear left wheel 8RL swings relative to the body member in the up-down direction as illustrated in FIG. 6, a rear portion of the rear left wheel 8RL is located more outward than a front portion thereof in the width direction of the vehicle. Thus, the rear left wheel 8RL is toed in as the vehicle body rolls.

As illustrated in FIG. 1, the steering system includes a steering ECU 80, as a controller, configured to control the steering actuators 14F, 14R of the front-wheel-side steering device 10F and the rear-wheel-side steering device 10R. The steering ECU 80 is constituted mainly by a computer and includes an executing device, a storage, an input/output device, and so on (all not illustrated). To the input/output device, there are connected a yaw rate sensor 90, a lateral acceleration (hereinafter simply referred to as "lateral G") sensor 92, a vehicle speed sensor 94, an operation amount sensor 96, an environment-relating information obtaining device 98 and so on. Further, the steering actuators 14F, 14R are connected to the input/output device.

The present steering system is a steer-by-wire steering system. In the present steering system, a steering operating member (not illustrated) operable by a driver is mechanically disconnected from the front-wheel-side steering device 10F and the rear-wheel-side steering device 10R. Accordingly, the steering ECU 80 controls the steering actuator 14F of the front-wheel-side steering device 10F and the steering actuator 14R of the rear-wheel-side steering device 10R, whereby the front left and right wheels 6FL, 6FR and the rear left and right wheels 8RL, 8RR are steered.

The yaw rate sensor 90 detects a yaw rate of the vehicle. The lateral G sensor 92 detects a lateral G that acts on the vehicle. The vehicle speed sensor 94 detects a running speed of the vehicle. Based on the yaw rate, the lateral G, the running speed, etc., a stroke in the up-down direction is obtained for each of the front left and right wheels 6FL, 6FR and the rear left and right wheels 8RL, 8RR. Here, the stroke is an amount of movement of each wheel 6FL, 6FR, 8RL, 8RR from a reference position in the up-down direction.

The operation amount sensor 96 detects an operation amount of the steering operating member (not illustrated) by the driver. The environment-relating information obtaining device 98 includes a camera, a laser, and the like. For instance, the environment-relating information obtaining device 98 obtains information on an environment relating to an own vehicle (that is the vehicle on which the present steering system is installed) such as an object in surroundings of the vehicle, obtains a relative positional relationship between the object and the own vehicle, and obtains a curved state of a road on which the own vehicle is traveling. Based on the operation amount of the steering operating member, the relative positional relationship between the own vehicle and the object indicated above, the curved state of the road, etc., a main target steering angle (that will be later explained) is obtained. In a case where the own vehicle is in an automated driving state (including a case in which the own vehicle is an automated vehicle), the main target steering angle is obtained based on the relative positional relationship between the own vehicle and the object in the surroundings of the own vehicle, the curved state of the road, etc.

Figure 7:
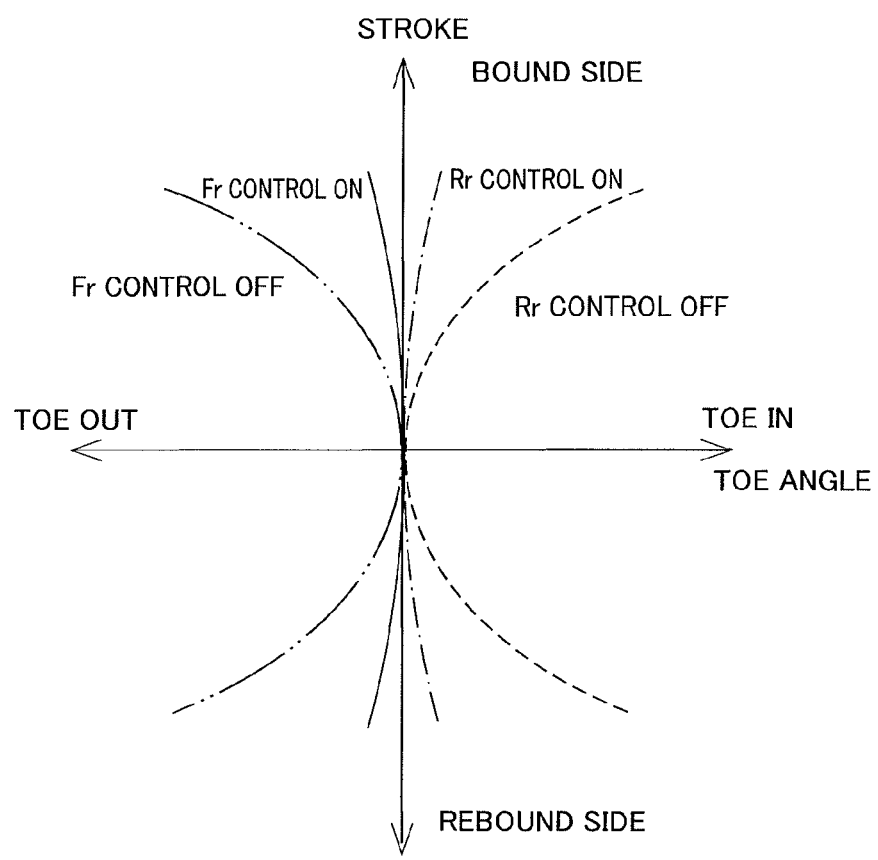
FIG. 7 is a view illustrating changes in a toe angle of each steerable wheel of the vehicle.

In the present embodiment, the steering actuators 14F of the front-wheel-side steering devices 10F are controlled such that a toe angle of each of the front left and right wheels 6FL, 6FR changes as indicated by the solid line in FIG. 7 in accordance with a change in the stroke in the up-down direction, and the steering actuators 14R of the rear-wheel-side steering devices 10R are controlled such that a toe angle of each of the rear left and right wheels 8RL, 8RR changes as indicated by the long dashed short dashed line in FIG. 7 in accordance with a change in the stroke in the up-down direction.

As described above, in the present embodiment, the steering actuator 14F is disposed on the inner side of the front side member 34F, and the steering actuator 14R is disposed on the inner side of the rear side member 34R. Thus, the tie rods 16F, 16R of the front-wheel-side steering device 10F and the rear-wheel-side steering device 10R are inevitably long. In this configuration, if the steering actuator 14F, 14R is not controlled as described above, the change in the toe angle that arises from the change in the stroke of the wheel in the up-down direction tends to be large and the toe angle with respect to the stroke in the up-down direction tends to be large. In this case, the toe angle of each of the front left and right wheels 6FL, 6FR changes as indicated by the long dashed double-short dashed line in FIG. 7 in accordance with the change in the stroke in the up-down direction, and the toe angle of each of the rear left and right wheels 8RL, 8RR changes as indicated by the dashed line in FIG. 7 in accordance with the change in the stroke in the up-down direction. When the toe angle is large or when the change in the toe angle is large, the drivability of the vehicle may be deteriorated. This is not desirable. In the present steering system, therefore, by controlling the steering actuator 14F, 14R as described above, the change in the toe angle that arises from the change in the stroke is made small and the toe angle with respect to the stroke in the up-down direction is made small. In view of this, the control of the steering actuator 14F, 14R executed in the present embodiment will be referred to as a toe-angle reducing control.

Figure 8:
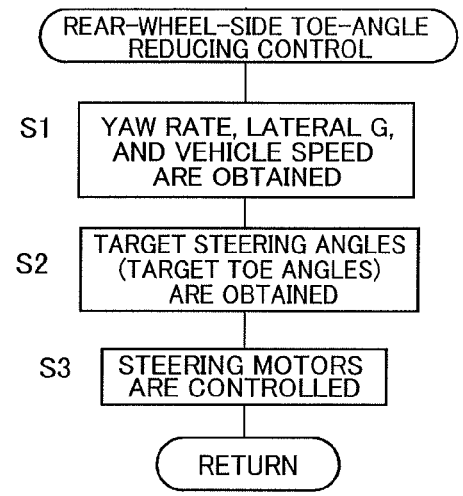
FIG. 8 is a flowchart representing a rear-wheel-side toe-angle reducing program stored in a storage of a controller of the steering system.
Figure 9:
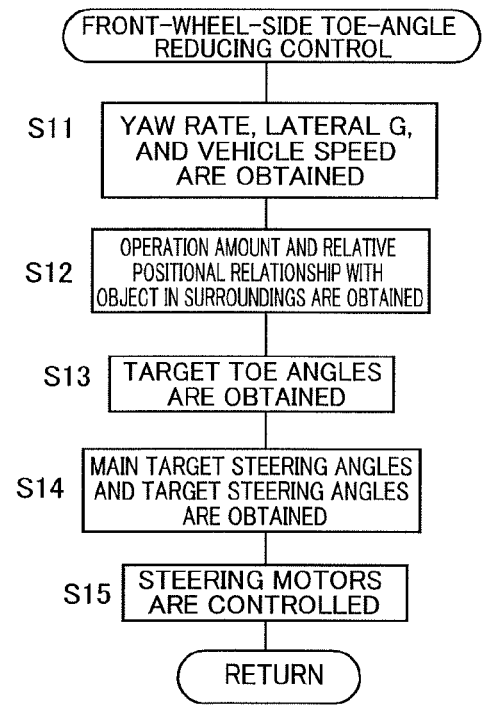
FIG. 9 is a flowchart representing a front-wheel-side toe-angle reducing program stored in the storage.

A rear-wheel-side toe-angle reducing program represented by a flowchart of FIG. 8 and a front-wheel-side toe-angle reducing program represented by a flowchart of FIG. 9 are stored in the storage of the steering ECU 80. These programs are executed by the executing device at a predetermined time pitch.

At Step 1 of the flowchart of FIG. 8, the yaw rate, the lateral G, and the running speed are obtained respectively by the yaw rate sensor 90, the lateral G sensor 92, and the vehicle speed sensor 94. (Hereinafter, Step 1 will be abbreviated as "S1" and other steps are similarly abbreviated.) Based on the obtained yaw rate, lateral G, and running speed, a roll amount of the vehicle is obtained, and the stroke in the up-down direction is obtained for each of the rear left and right wheels 8RL, 8RR.

At S2, a target toe angle is obtained for each of the rear left and right wheels 8RL, 8RR based on the stroke thereof in the up-down direction and the characteristics indicated by the long dashed short dashed line in FIG. 7, and the target toe angle is determined to be equal to the target steering angle in each rear-wheel-side steering device 10R. At S3, the steering motors 26R of the steering actuators 14R are feedforward controlled such that actual steering angles of the rear left and right wheels 8RL, 8RR become equal to the target steering angles.

At S11 in the flowchart of FIG. 9, the yaw rate, the lateral G, and the vehicle speed are obtained. At S12, the operation amount of the steering operating member is obtained by the operation amount sensor 96, and the curved state of the road and the relative positional relationship between the own vehicle and the object in the surroundings of the own vehicle are obtained by the environment-relating information obtaining device 98. At S13, the target toe angle is obtained for each of the front left and right wheels 6FL, 6FR based on the stroke thereof in the up-down direction and the characteristics indicated by the solid line in FIG. 7. At S14, the main target steering angle is obtained for each of the front left and right wheels 6FL, 6FR based on the operation amount of the steering operating member, the curved state of the road, the relative positional relationship between the own vehicle and the object in the surroundings of the own vehicle, and so on. An angle obtained by adding the target toe angle and the main target steering angle is determined to be a final target steering angle for each of the front left and right wheels 6FL, 6FR. (In adding the target toe angle and the main target steering angle, the steering angle in turning to the right is defined as taking a positive value (+) while the steering angle in turning to the left is defined as taking a negative value (−), for instance. The same applies hereinafter.) At S15, the steering motors 26F of the steering actuators 14F are feedforward controlled such that actual steering angles of the front left and right wheels 6FL, 6FR become close to the respective target steering angles.

In a case where a malfunction occurs in at least one of the yaw rate sensor 90, the lateral G sensor 92, and the vehicle speed sensor 94, it is difficult to obtain the target toe angles, thus making it difficult to execute the toe-angle reducing control.

In a case where the operation amount sensor 96, the environment-relating information obtaining device 98, etc., normally operate, the main target steering angle is obtained for each of the front left and right wheels 6FL, 6FR based on the operation amount of the steering operating member, the curved state of the road, the relative positional relationship between the own vehicle and the object in the surroundings of the own vehicle. The main target steering angle for each of the front left and right wheels 6FL, 6FR is determined to be the target steering angle. The steering motors 26F of the steering actuators 14F of the front-wheel-side steering devices 10F are feedforward controlled such that actual steering angles of the front left and right wheels 6FL, 6FR become close to the respective target steering angles.

The actual steering angle of each of the front left and right wheels 6FL, 6FR is an angle by adding the target steering angle and the toe angle determined according to the long dashed double-short dashed line in FIG. 7. Each of the front left and right wheels 6FL, 6FR is toed-out at an angle larger than the target steering angle. Though the control is not executed for the steering motors 26R of the rear-wheel-side steering devices 10R, the rear left and right wheels 8RL, 8RR are toed in both when they rebound and when they bound as indicated by the dashed line in FIG. 7.

Consequently, the steering characteristic of the vehicle is understeer tendency, thus preventing the running stability from being deteriorated.

In the present embodiment, a toe-angle reducing controller is constituted by a portion of the steering ECU 80 that stores the rear-wheel-side toe-angle reducing control program represented by the flowchart of FIG. 8 and the front-wheel-side toe-angle reducing control program represented by the flowchart of FIG. 9, and a portion of the steering ECU 80 that executes the programs of FIGS. 8 and 9, for instance.

In the embodiment illustrated above, the steering system is applied to the 4-wheel steering vehicle. The present steering system is applicable to front-wheel steering vehicles or rear-wheel steering vehicles.

It is not essential that the front left and right wheels 6FL, 6FR are toed out and the rear left and right wheels 8RL, 8RR are toed in in the 4-wheel steering vehicle. In the 4-wheel steering vehicle, the front left and right wheels 6FL, 6FR may be toed out or the rear left and right wheels 8RL, 8RR may be toed in.

The steering system may be installed on a vehicle in which the front side member 34F and the rear side member 34R are formed in one piece.

The configuration for controlling the steering angle is not limited to that described above. It is to be understood that the present disclosure is not limited to the details of the embodiment illustrated above but may be embodied with various changes and modifications based on the knowledge of those skilled in the art.

Claimable Invention (1) A steering system including a plurality of steering devices respectively provided for a plurality of steerable wheels that belong to at least one of a front-wheel side and a rear-wheel side of a vehicle, wherein the plurality of steering devices respectively include a plurality of steering actuators, and wherein each of at least one of the plurality of steering actuators is disposed on an inner side of a corresponding one of side members of the vehicle.

The vehicle on which the present steering system is installed may be a vehicle whose front left and right wheels are the steerable wheels, a vehicle whose rear left and right wheels are the steerable wheels, or a 4-wheel steering vehicle whose front right and left wheels and rear right and left wheels are the steerable wheels. In a case where the present steering system is installed on the 4-wheel steering vehicle, the steering actuators of the steering devices provided for the steerable wheels that belong to one of the front-wheel side and the rear-wheel side may be disposed on the inner side of the corresponding side members or the steering actuators of the steering devices provided for all the steerable wheels that belong to the front-wheel side and the rear-wheel side may be disposed on the inner side of the corresponding side members.

(2) The steering system according to the form (1), wherein the plurality of steerable wheels include front left and right wheels that belong to the front-wheel side, wherein the plurality of steering devices include front-wheel-side left and right steering devices respectively provided for the front left and right wheels, wherein each of the front left and right wheels is supported, via a corresponding one of suspension arms, by a corresponding one of body members that include the side members so as to be movable in an up-down direction relative to the corresponding one of the body members, wherein the front-wheel-side left and right steering devices respectively include tie rods each of which connects an output shaft of a corresponding one of the plurality of steering actuators and a corresponding one of the front left and right wheels, and wherein each of the tie rods is disposed such that the corresponding one of the front left and right wheels is toed out when it moves in the up-down direction relative to the corresponding one of the body members.

The suspension arm may be connected to the side member as the body member or may be connected to the body member different from the side member.

(3) The steering system according to the form (2), wherein each of the tie rods has a length greater than a length of the corresponding one of the suspension arms and is disposed forward of the corresponding one of the suspension arms.

The length of the suspension arm refers to a length of a portion thereof that holds the wheel such that the wheel is swingable in the up-down direction. The connecting portion of the tie rod with the front wheel and the connecting portion of the tie rod with the steering actuator are disposed forward of the connecting portion of the suspension arm with the front wheel and the connecting portion of the suspension arm with the body member in the front-rear direction of the vehicle.

(4) The steering system according to any one of the forms (1) through (3), wherein the plurality of steerable wheels include rear left and right wheels that belong to the rear-wheel side, wherein the plurality of steering devices include rear-wheel-side left and right steering devices respectively provided for the rear left and right wheels, wherein each of the rear left and right wheels is supported, via a corresponding one of suspension arms, by a corresponding one of body members that include the side members so as to be movable in an up-down direction relative to the corresponding one of the body members, wherein the rear-wheel-side left and right steering devices respectively include tie rods each of which connects an output shaft of a corresponding one of the plurality of steering actuators and a corresponding one of the rear left and right wheels, and wherein each of the tie rods is disposed such that the corresponding one of the rear left and right wheels is toed in when it moves in the up-down direction relative to the corresponding one of the body members.

(5) The steering system according to the form (4), wherein each of the tie rods has a length greater than a length of the corresponding one of the suspension arms and is disposed backward of the corresponding one of the suspension arms.

(6) The steering device according to any one of the forms (1) through (5), wherein each of the plurality of steering actuators is shaped so as to extend in a longitudinal direction thereof, and each of the at least one of the plurality of steering actuators is attached, at an intermediate portion thereof in the longitudinal direction, to an inside portion of the corresponding one of the side members.

(7) The steering system according to the form (6),
wherein each of the plurality of steering actuators includes an electric motor and a speed reducer configured to decelerate rotation of the electric motor and output the decelerated rotation, and
wherein the electric motor and the speed reducer are disposed in series in the longitudinal direction.

(8) The steering system according to any one of the forms (1) through (7), further including a controller configured to control the plurality of steering actuators,
wherein the controller includes a toe-angle reducing controller configured to control the at least one of the plurality of steering actuators to reduce a toe angle of at least one of the steerable wheels that corresponds to the at least one of the plurality of steering actuators.

(9) The steering device according to any one of the forms (1) through (8), wherein a drive source installed on the vehicle does not include an engine.

(10) A steering device configured to steer a steerable wheel of a vehicle, the steering device including a steering actuator,
wherein the steering actuator is disposed on an inner side of a side member of the vehicle.

The steering device of this form may employ the technical features described in any one of the forms (1) through (9).

(11) A steering device provided for each of front left and right wheels of a vehicle, the steering device being configured to independently steer a corresponding one of the front left and right wheels,
wherein each of the front left and right wheels is supported, via a corresponding one of suspension arms, to a corresponding one of body members so as to be movable in an up-down direction relative to the corresponding one of the body members,
wherein the steering device includes a steering actuator and a tie rod that connects an output shaft of the steering actuator and the corresponding one of the front left and right wheels, and
wherein the tie rod is longer than the corresponding one of the suspension arms and is disposed such that the corresponding one of the front left and right wheels is toed out when it moves in the up-down direction relative to the corresponding one of the body members.

The steering device of this form may employ the technical features described in any one of the forms (1) through (9).

(12) A steering device provided for each of rear left and right wheels of a vehicle, the steering device being configured to independently steer a corresponding one of the rear left and right wheels,
wherein each of the rear left and right wheels is supported, via a corresponding one of suspension arms, to a corresponding one of body members so as to be movable in an up-down direction relative to the corresponding one of the body members,
wherein the steering device includes a steering actuator and a tie rod that connects an output shaft of the steering actuator and the corresponding one of the rear left and right wheels, and
wherein the tie rod is longer than the corresponding one of the suspension arms and is disposed such that the corresponding one of the rear left and right wheels is toed in when it moves in the up-down direction relative to the corresponding one of the body members.

The steering device of this form may employ the technical features described in any one of the forms (1) through (9).

(13) A steering actuator holding device configured to hold a steering actuator configured to steer a steerable wheel of a vehicle,
wherein the steering actuator includes a housing that holds an electric motor and a speed reducer,
wherein the steering actuator holding device includes:
a side member as a body member;
a bracket provided on the housing; and
an attaching device by which the bracket is attached to an inside portion of the side member.

The steering device of this form may employ the technical features described in any one of the forms (1) through (9).

What is claimed is:

1. A steering system including a plurality of steering devices respectively provided for a plurality of steerable wheels that belong to at least one of a front-wheel side and a rear-wheel side of a vehicle,
wherein the plurality of steering devices respectively include a plurality of steering actuators,
wherein each of at least one of the plurality of steering actuators is disposed on an inner side of a corresponding one of side members of the vehicle,
wherein the plurality of steerable wheels include front left and right wheels that belong to the front-wheel side,
wherein the plurality of steering devices include front-wheel-side left and right steering devices respectively provided for the front left and right wheels,
wherein each of the front left and right wheels is supported, via a corresponding one of suspension arms, by a corresponding one of body members that include the side members so as to be movable in an up-down direction relative to the corresponding one of the body members,
wherein the front-wheel-side left and right steering devices respectively include tie rods each of which connects an output shaft of a corresponding one of the plurality of steering actuators and a corresponding one of the front left and right wheels, and
wherein each of the tie rods is disposed such that the corresponding one of the front left and right wheels is toed out when moved in the up-down direction relative to the corresponding one of the body members.

2. The steering system according to claim 1, wherein each of the tie rods has a length greater than a length of the corresponding one of the suspension arms and is disposed forward of the corresponding one of the suspension arms.

3. A steering system including a plurality of steering devices respectively provided for a plurality of steerable wheels that belong to at least one of a front-wheel side and a rear-wheel side of a vehicle,
wherein the plurality of steering devices respectively include a plurality of steering actuators,
wherein each of at least one of the plurality of steering actuators is disposed on an inner side of a corresponding one of side members of the vehicle,
wherein the plurality of steerable wheels include rear left and right wheels that belong to the rear-wheel side,
wherein the plurality of steering devices include rear-wheel-side left and right steering devices respectively provided for the rear left and right wheels,
wherein each of the rear left and right wheels is supported, via a corresponding one of suspension arms, by a corresponding one of body members that include the side members so as to be movable in an up-down direction relative to the corresponding one of the body members, wherein the rear-wheel-side left and right steering devices respectively include tie rods each of which connects an output shaft of a corresponding one of the plurality of steering actuators and a corresponding one of the rear left and right wheels, and wherein each of the tie rods is disposed such that the corresponding one of the rear left and right wheels is toed in when moved in the up-down direction relative to the corresponding one of the body members.

4. He steering system according to claim 3, wherein each of the tie rods has a length greater than a length of the corresponding one of the suspension arms and is disposed backward of the corresponding one of the suspension arms.

5. The steering system according to claim 1, further including a controller configured to control the plurality of steering actuators, wherein the controller includes a toe-angle reducing controller configured to control the at least one of the plurality of steering actuators to reduce a toe angle of at least one of the steerable wheels that corresponds to the at least one of the plurality of steering actuators.

6. The steering system according to claim 3, further including a controller configured to control the plurality of steering actuators, wherein the controller includes a toe-angle reducing controller configured to control the at least one of the plurality of steering actuators to reduce a toe angle of at least one of the steerable wheels that corresponds to the at least one of the plurality of steering actuators.

* * * * *